Feb. 10, 1931.  R. J. JACKER  1,792,306
AUTOMATIC SPEED CHANGING MECHANISM
Filed Dec. 26, 1924    2 Sheets-Sheet 1
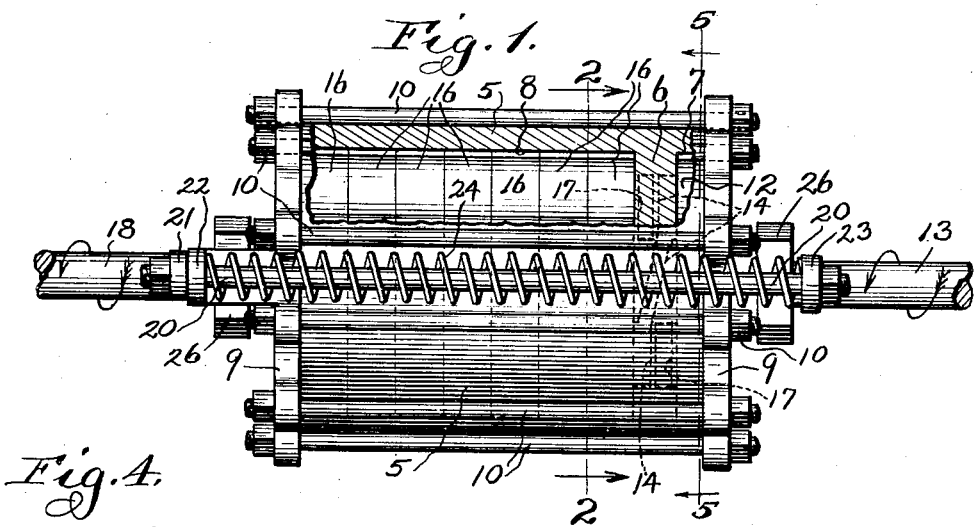
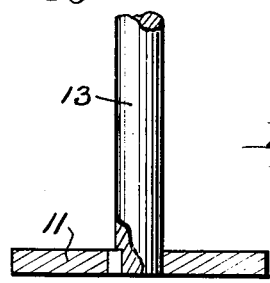
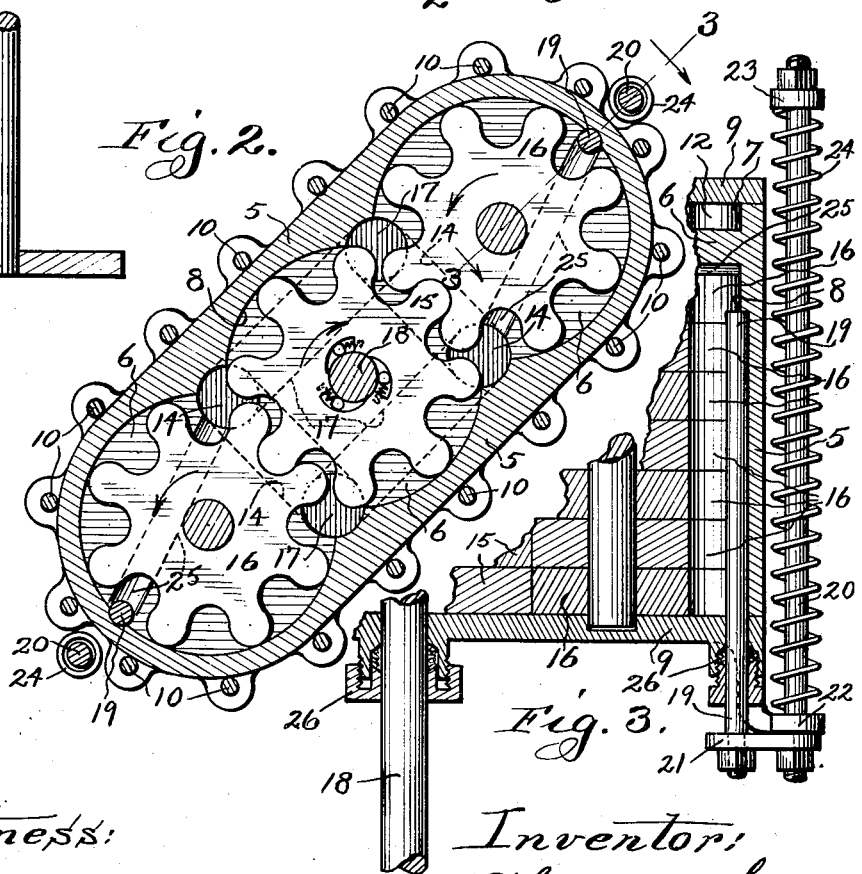
Witness:
C. S. Cassiday
Inventor:
Richard J. Jacker

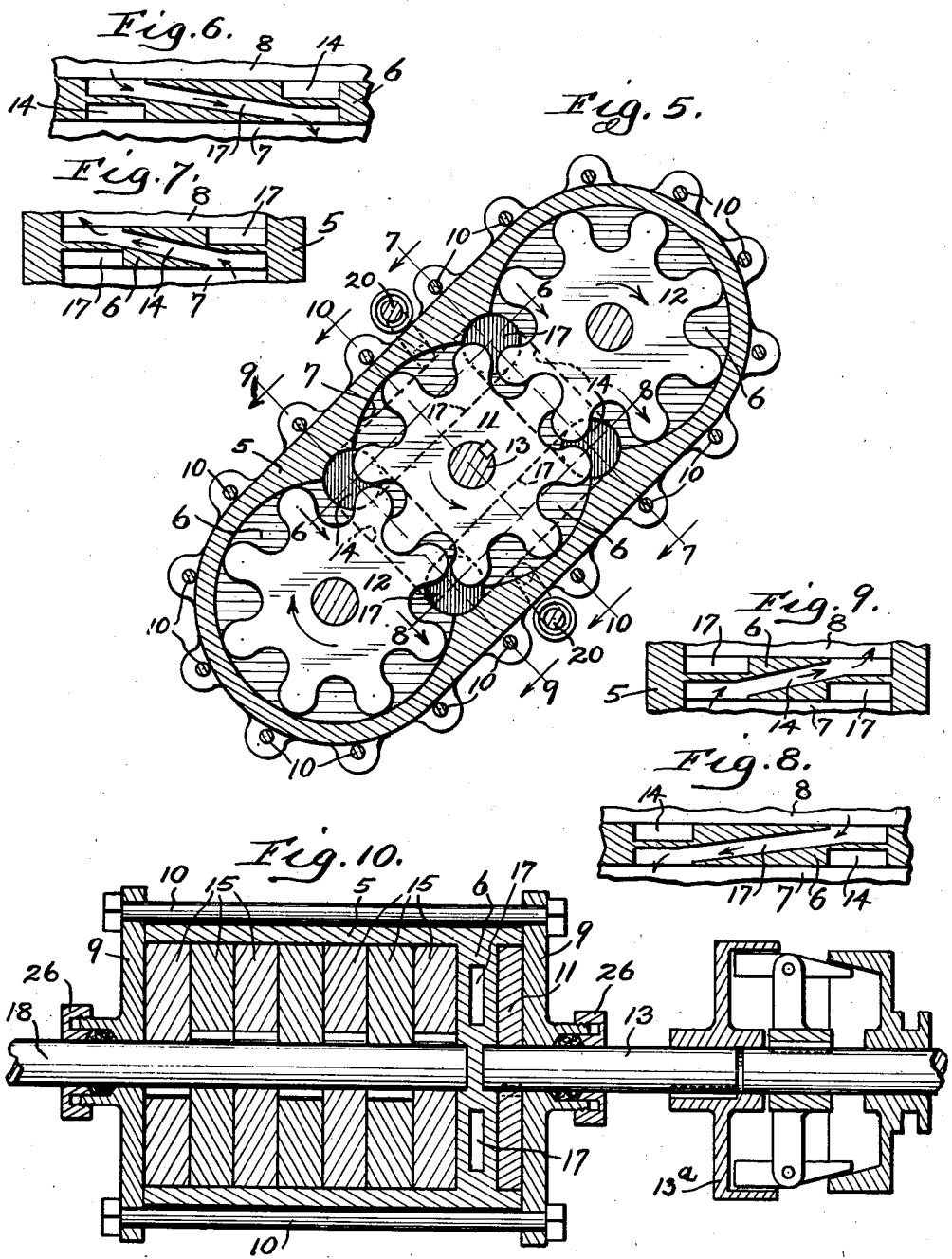

Patented Feb. 10, 1931

1,792,306

UNITED STATES PATENT OFFICE

RICHARD J. JACKER, OF DETROIT, MICHIGAN

AUTOMATIC SPEED-CHANGING MECHANISM

Application filed December 26, 1924. Serial No. 757,999.

My invention relates to power transmission mechanism employed for transmitting power to the traction wheels of an automobile from the engine or motor, but may be employed for any drive where low and high speeds are desired from a constantly running motor, and the objects of my improvements are first, to arrange a large number of different speeds between the driving shaft and the driven shaft; second, to change from one speed to another without disconnecting the clutch; third, to so construct the mechanism that the driven shaft will be automatically started at the lowest speed and automatically be driven at a higher and higher speed as the resistance on the driven shaft decreases; fourth, to employ liquid under pressure for automatically changing the speed; fifth, to employ liquid as the driving fluid; sixth, to employ liquid as a driving fluid only for the speeds below high speed; seventh, to make a simple, durable and efficient device and other features to become apparent from the description to follow.

In devices where a change of speed is required, especially in automobiles, it is very desirable to have a large number of speeds between the low and the high; to change from one speed to another without the necessity of throwing out the clutch; to have the change of speeds automatically operated; and to have the highest speed a direct drive, and all these desirable features are attained by the use of my invention which comprises a suitable casing provided with a small and a large compartment and a liquid pump in the small compartment and a plurality of liquid motors in the large compartment. The pump in the small compartment is arranged to be driven by the driving shaft and the motors in the large compartment are arranged to drive the driven shaft in one direction only so that any of the said motors may be inoperative and yet the driven shaft may be rotated by any other motor in the large compartment.

To describe my invention so that others versed in the art to which it pertains can make and use the same, I have illustrated it on the accompanying two sheets of drawings forming a part of this specification and in which:

Figure 1, is a side elevation partly in section of a power transmission embodying my invention; Fig. 2, is a sectional view taken on line 2—2 of Fig. 1, looking in the direction indicated by the arrows; Fig. 3, is a sectional view taken on line 3—3 of Fig. 2, looking in the direction indicated by the arrows, Fig. 4, is an elevation partly in section of the pump member removed from the small compartment; Fig. 5, is a section taken on line 5—5 of Fig. 1, viewed in the direction indicated by the arrows; Fig. 6, 7, 8 and 9 are sectional views taken on lines 6—6, 7—7, 8—8, and 9—9, respectively of Fig. 5, viewed in the direction indicated by the arrows, and Fig. 10, is a central longitudinal sectional view taken on line 10—10 of Fig. 5.

Similar reference characters refer to similar parts throughout the several views.

The casing comprises a main shell 5 provided with a transverse partition 6 which divides the interior into two compartments, a small compartment 7 and a large compartment 8. The two open ends of the shell 5 are closed by suitable heads 9 which are preferably secured in proper position by the bolts and nuts 10. A rotary pump is provided in the small compartment 7 which comprises a center gear 11 and two idle gears 12 meshing therewith. The center gear 11 is keyed to the driving shaft 13 which when rotated in the direction indicated by the arrow at the right in Fig. 1, will force the liquid, preferably oil, from the compartment 7 through the passages 14 into the compartment 8. The passages 14 are formed in the partition 6 as shown in Figs. 1 and 2, and 6 to 10 inclusive and each extends from the discharges of the pump in the compartment 7 to the intakes of the motors in the compartment 8, so that a gear motor comprising a center gear 15 and two idlers 16 mounted in compartment 8 and in axial alignment with the gears 11 and 12, will be rotated in the same direction as the co-axially located gears 11 and 12. I provide a plurality of separate gear motors in the compartment 8, each motor comprising three gears 15, 16 and 16. In the drawing seven such separate gear motors are shown, but it is obvious that any number of such motors may be provided in the compartment 8. Obviously if a pump of a given size is provided in the compartment 7 and seven motors of the same size and capacity are provided in the compartment 8, the seven motors will rotate one-seventh as fast as the one pump in compartment 7; similarly if six such motors are provided in compartment 8, they will rotate one-sixth as fast as the one pump in compartment 7; and so on, if two such motors are provided in compartment 8, they will rotate one-half as fast as the one pump in compartment 7. Suitable passages 17 similar to the passages 14, are provided in the partition 6 connecting the discharge from the motor or motors in compartment 8 with the intake of the pump in compartment 7, so that the oil is constantly forced from the compartment 7 through the passages 14 into the compartment 8 and thence through the passages 17 back into the compartment 7, thus when the driving shaft 13 is rotated the motor or motors in compartment 8 are operated. Each one of the center gears 15 of the motors in compartment 8 is provided with an automatic clutch mechanism at its center which will act to carry the shaft 18 on which it is mounted around with it in one direction only and will permit the shaft to freely rotate faster or ahead of said gear 15. Thus it will be understood when the shaft 13 is rotated in the direction indicated in Fig. 1, by arrow, the shaft 18 will be rotated in the direction indicated by arrow. The shaft 18 extends through the head 9 to the exterior where it can be connected to any desirable mechanism to be driven as for example the traction wheels of an automobile. The shaft 13 extends through the other head 9 to the exterior where it is connected to any suitable motor as for example an internal combustion engine, preferably through the interposition of a friction clutch 13ª.

It will be noted that the drawing shows the gears 11, 12 and 12 one half as thick as the gears 15, 16 and 16 so that one motor in the compartment 8 has twice the capacity of the pump in compartment 7, therefore if only one gear motor is operating in compartment 8, it will make one turn for every two turns of the gear pump in compartment 7; and if the seven gear motors in compartment 8 are operating they will make one turn for every fourteen turns of the gear pump in compartment 7. Thus if one motor in compartment 8 is held against operation the six remaining motors will make one revolution for every twelve revolutions of the pump in compartment 7; if two motors in compartment 8 are held against operation the remaining five motors will make one turn for every ten turns of the pump in compartment 7; if three motors in compartment 8 are held against operation the remaining four motors will make one turn for every eight turns of the pump in compartment 7, and so on until all the motors in compartment 8 are held against operation when the oil or other fluid is prevented from circulating through the passages 14 and 17 and the entire casing with its contents rotates with the shafts 13 and 18 as a unit. The gear motors in compartment 8 may be held against operation by manual power but I prefer to automatically hold the same against operation. It is understood that more power is required to start an automobile than to continue to keep one in motion after once started, therefore the pressure will be greater on the oil used in the gear pump and motors when starting the automobile than it will be after the car is once in motion. Of course going over bad roads and up hills will also require much more power than traveling along hard level roads. However I so arrange the automatic mechanism that whenever more power is needed a greater number of motors in compartment 8 are permitted to operate. To automatically hold and release the motors in compartment 8 I provide a sliding rod 19 which enters the compartment 8 through the head 9 in such position that it will lie in the path of the teeth of a loose or idle gear 16, as shown in Figs. 1, 2 and 3; it will be understood that the rods 19 may be so located as to move into the paths of the center motor gears 15 as indicated in Fig. 5, and on the exterior of the casing said rod 19 is connected in such manner to a spring that the spring will tend to yieldingly hold the rod in its furthermost position in the compartment 8. As shown the exposed end of the rod 19 is rigidly connected to the rod 20 by means of the connecting plate 21. The rod 20 slides loosely through the guide 22 secured to the head 9 of the casing. The remaining end of the rod 20 is provided with an enlarged head or washer 23, and a coiled expanding spring 24 is interposed between the washer 23 and the guide 22. The tension of the spring 24 is such that the rod 19 will be held in the compartment 8 to hold all the motor gears in said compartment against operation and against the oil pressure at a time when the highest speed and the least power is required. As additional power is required, the pressure of oil in compartment 8 increases, because the resistance on shaft 18 is greater, and this increase in pressure in turn will act on the end of rod 19 and will thus compress the spring 24 and move rod 19 in an outward direction releasing first the gear motor adjacent the partition 6; and then each successive gear motor in its turn until the last one adjacent the head 9 is released; when in such position the greatest possible power is exerted on shaft 18 because the shaft 13 will rotate fourteen times to the one rotation of shaft 18. Then as the automobile, or other mechanism being driven, gains momentum the pressure of oil in the compartment 8 will gradually become less and the spring 24 will push the rod 19 into the paths of the gear motors in the reverse order i. e. first it will hold against operation the motor adjacent the head 9 and lastly will hold the motor adjacent the partition 6 against operation.

It will be noted that to balance the entire mechanism about the axis of the shafts, I provide two rods 19 with their operating mechanism on diametrically opposite sides of said axis.

To insure the oil pressure reaching the ends of the rods 19 directly from the passages 14, suitable grooves 25 are provided in the face of the partition 6. Suitable stuffing boxes 26 are provided wherever necessary.

It will be understood that the size, form and arrangement of the parts may be radically changed without in the least departing from the scope of my invention.

Having thus fully described my invention what I claim as new and desire to secure by Letters Patent of the United States is:

1. In a device of the class described, a suitable casing provided with a small compartment and a large compartment, a fluid pump in said small compartment, a plurality of fluid motors in said large compartment, the outlets and intakes of said pump and motors being so arranged that the operation of the pump in the small compartment will operate the motors in the large compartment and means comprising a plunger bar entering the large compartment to hold any number of motors in the large compartment against operation, automatically controlled by the resisting pressure on the motors in the large compartment.

2. In a device of the class described, a suitable casing provided with a small compartment and a large compartment, a fluid pump in the small compartment, a plurality of fluid motors in the large compartment, the outlets and intakes of said pump and motors being so arranged that the operation of the pump in the small compartment will operate the motors in the large compartment and means comprising a plunger bar entering the large compartment in the path of the motors for holding any number of motors in the large compartment against operation automatically, being controlled by the resisting pressure in the large compartment.

3. In a device of the class described, a suitable rotatable casing provided with a driving pump and a plurality of driven motors mounted on a driven shaft and means controlled by the pump fluid pressure to hold any number of the driven motors against operation, the said pump fluid pressure being varied by the varied resistance on the motors through said driven shaft.

4. In a device of the class described, a driving shaft, a driven shaft in axial alignment with the driving shaft, a suitable casing rotatably mounted on both shafts, a driving pump connected to be operated by the driving shaft within the casing, a driven motor within said casing arranged to drive the driven shaft and means controlled by the pressure of the fluid passing from the pump to the motor for locking the driving pump and the driven motor together so that the driving shaft, the driven shaft and the casing will rotate in unison.

5. In a device of the class described, a driving shaft, a driven shaft in axial alignment with the driving shaft, a suitable casing rotatably mounted on both shafts, a driving pump connected to be rotated by the driving shaft within said casing, a plurality of driven motors within said casing arranged to drive the driven shaft and means controlled by the pump fluid pressure for automatically changing the ratio of speed between the driving pump and the driven motors and for locking the driving pump, the driven motors and the casing together so that all three will rotate in unison.

6. In a device of the class described, a driving shaft, a driven shaft in axial alignment with the driving shaft, a suitable casing rotatably mounted on both shafts and driving mechanism within said casing to rotate the driven shaft at different ratios of speed with relation to the speed of the driving shaft automatically according to the resistance on the driven shaft.

7. In a device of the class described, a driving shaft, a driven shaft in axial alignment with the driving shaft, a suitable casing rotatably mounted on both shafts, a fluid pump within said casing connected to be driven by said driving shaft, a plurality of fluid actuated motors within the casing connected to drive the driven shaft in one direction and means controlled by the pump fluid pressure for locking any number of said motors against operation.

8. In a device of the class described, a suitable casing provided with a small compartment and a large compartment, a fluid pump in the small compartment arranged to be driven by a shaft, a plurality of fluid motors in the large compartment so mounted on a shaft that they will drive the shaft in one direction only, the outlets and intakes of said pump and said motors being so arranged that the operation of the pump will operate the motors and means controlled by the pump fluid pressure to hold any number of the motors against operation.

9. In a device of the class described, a suitable casing provided with a small compartment and a large compartment, a fluid pump in the small compartment arranged to be driven by a shaft, a plurality of fluid motors in the large compartment so mounted on a shaft that they will drive the shaft in one direction only, the outlets and intakes of said pump and motors being so arranged that the operation of the pump will operate the motors and means controlled by the pump fluid pressure to hold any number of the motors in the large compartment against operation automatically.

10. In a device of the class described, a suitable casing provided with a small compartment and a large compartment, a fluid pump in said small compartment, a plurality of fluid motors in said large compartment so mounted on a shaft that they will drive the shaft in one direction only, the outlets and inlets of said pump and motors being so arranged that the operation of the pump in the small compartment will operate the motors in the large compartment and means controlled by the pump fluid pressure comprising a plunger bar entering the large compartment to hold any number of motors in the large compartment against operation automatically.

11. In a device of the class described, a suitable casing provided with a small compartment and a large compartment, a fluid pump in the small compartment, a plurality of fluid motors in the large compartment, so mounted on a shaft that they will drive the shaft in one direction only, the outlets and inlets of said pump and motors being so arranged that the operation of the pump in the small compartment will operate the motors in the large compartment and means controlled by the pump fluid pressure comprising a plunger bar entering the large compartment in the path of the motors to hold any number of motors in the large compartment against operation automatically.

12. In a device of the class described, a suitable casing provided with a driving pump and a plurality of driven motors, said motors being so mounted on a shaft that they will drive the shaft in one direction only, and means controlled by the pump fluid pressure to hold any number of the motors against operation.

13. In a device of the class described, a suitable rotatable casing provided with a driving pump and a plurality of driven motors, said motors being so mounted on a shaft that they will drive the shaft in one direction only, and means controlled by the pump fluid pressure to hold any number of the driven motors against operation.

14. In a device of the class described, a suitable casing provided with a small compartment and a large compartment, a fluid pump in said small compartment, a plurality of fluid motors in said large compartment, the outlets and intakes of said pump and motors being so arranged that the operation of the pump in the small compartment will operate the motors in the large compartment and means comprising a plunger bar entering the large compartment to hold any number of the motors in the large compartment against opereration.

15. In a device of the class described, a suitable casing provided with a small compartment and a large compartment, a fluid pump in the small compartment, a plurality of fluid motors in the large compartment, the outlets and intakes of said pump and motors being so arranged that the operation of the pump in the small compartment will operate the motors in the large compartment and means comprising a plunger bar entering the large compartment in the path of the motors for holding any number of the motors in the large compartment against operation.

16. In a device of the class described, a suitable casing provided with a small compartment and a large compartment, a fluid pump in the small compartment, a plurality of fluid motors in the large compartment so mounted on a shaft that they will drive the shaft in one direction only, the outlets and intakes of said pump and motors being so arranged that the operation of the pump in the small compartment will operate the motors in the large compartment and means comprising a plunger bar entering the large compartment to hold any number of the motors in the large compartment against operation.

17. In a device of the class described, a suitable casing provided with a small compartment and a large compartment, a fluid pump in the small compartment, a plurality of fluid motors in the large compartment so mounted on a shaft that they will drive the shaft in one direction only, the outlets and intakes of said pump and motors being so arranged that the operation of the pump will operate the motors and means comprising a plunger bar entering the large compartment in the path of the motors to hold any number of the motors against operation.

In testimony whereof I have signed my name to this specification this 23rd day of December, 1924, at Chicago, Illinois.

RICHARD J. JACKER.